June 26, 1962     E. F. MACKS     3,040,760

CONDUIT

Filed April 4, 1957

INVENTOR.
ELMER FRED MACKS
BY Pyle & Fisher
ATTORNEYS

United States Patent Office 3,040,760
Patented June 26, 1962

3,040,760
CONDUIT
Elmer Fred Macks, Willow Lane, Vermillion, Ohio
Filed Apr. 4, 1957, Ser. No. 650,726
7 Claims. (Cl. 137—13)

The present invention relates to the art of fluid conduction and more particularly to an improved fluid conduit and a method of transporting fluids.

When fluids are conducted through conduits a considerable portion of the transportation energy is converted to heat energy and lost. This conversion of energy has long been recognized. A large part of the lost energy is attributable to friction between the flowing fluid and the conduit. This frictional energy loss is often referred to as pressure loss.

The pressure loss experienced by a fluid is proportional to the viscosity of the fluid. The more viscous the fluid, the more it tends to cling to its conducting conduit and therefore the greater the pressure loss.

One of the principal objects of this invention is to provide a novel and improved method and apparatus for the conduction of fluids wherein pressure loss is almost completely eliminated.

Another and related object of the invention is to provide a novel and improved method and apparatus for interposing a layer of a fluid of light viscosity, such as a gas, between the wall of the conduit and the fluid to be conducted.

This latter objective is achieved by causing the "lubricating fluid" to pass through a foraminous conduit wall and form a load supporting fluid layer between the fluid being transported and the foraminous wall.

Still another object of the invention is to provide a novel and improved conduit having an outer imperforate sleeve, an inner foraminous fluid conducting sleeve, a cavity between the sleeves, and means to supply fluid under pressure to the cavity.

A further and more detailed object of the invention is to provide a novel and improved method and apparatus for the transportation of molten metal, molten glass, or other hot or corrosive fluid.

Another object of the invention is to provide a novel and improved method for the transport of "sticky" substances such as glue, plastics, and foodstuffs.

Another object of the invention is to provide a sectioned fluid conduit made in accordance with the foregoing objects.

A further object of the invention is to provide an improved coaxial conduit connection wherein close end-to-end relationship is assured between adjacent inner sleeves and fluid tight relationship is assured between adjacent outer sleeves.

Other objects and a fuller understanding of the invention may be had by referring to the following description and claims, taken in conjunction with the accompanying drawings, in which:

A conduit is shown generally at 10. The conduit 10 has an inner foraminous sleeve 11 and an outer imperforate sleeve 12. The sleeves are supported in spaced relationship. Struts 13 may be interposed between the sleeves to serve this function.

The inner or foraminous sleeve may be formed with the foramina taking any of the now well known forms of compensating fluid conduction. Capillary and orifice fluid compensation are examples. The inner sleeve 11 in its disclosed form is a porous sintered body.

Figure 1:
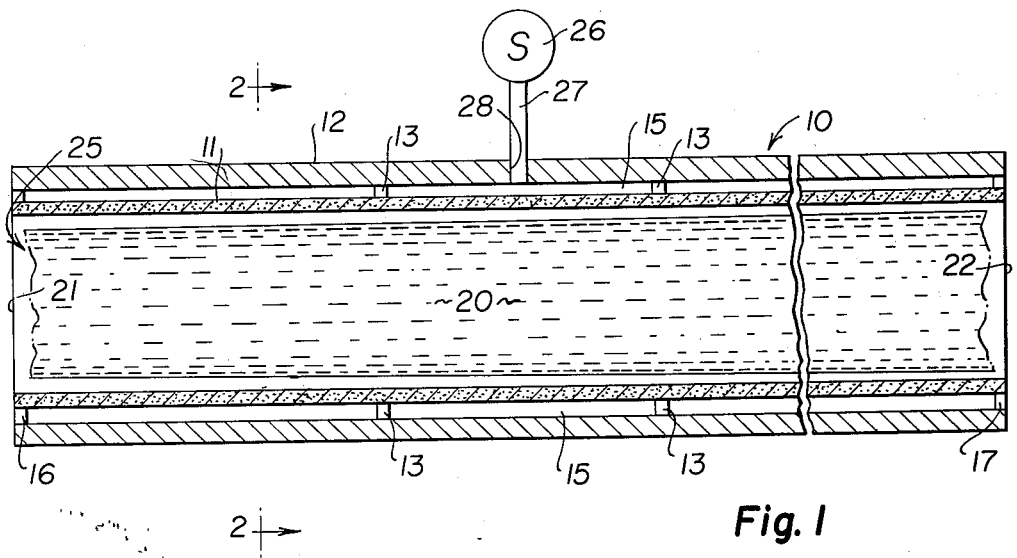
FIGURE 1 is a foreshortened sectional view, partly schematic, of a conduit made in accordance with the present invention.
Figure 2:
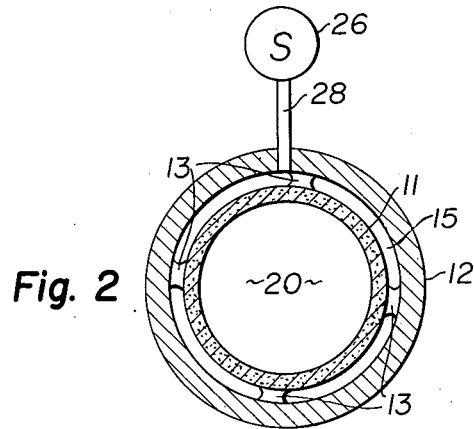
FIGURE 2 is a sectional view as seen from the plane indicated by the line 2—2 of FIGURE 1; and, FIGURE 3 is a foreshortened fragmentary sectional view showing the improved connection of adjacent coaxial conduits made in accordance with the present invention.

An annular cavity 15 is defined by the inner and outer sleeves 11, 12. At the lefthand end of FIGURE 1 the cavity 15 is closed by end closures 16. At its right hand end the cavity 15 is closed by the end closure 17. The cavity 15 is defined by imperforate members with the exception of the inner sleeve 11. Thus when fluid under pressure is introduced into the chamber 15, it escapes by passing through the foraminous sleeve 11.

The inner sleeve 11 defines a through passage 20 open at its first and second ends 21, 22. For convenience in manufacture, and for the greatest strength for any given wall thickness, the sleeves 11, 12 are preferably manufactured in the conventional cylindrical form. It should be understood, however, that the sleeves need only be tubular to define the through passage 20 and the cavity 15 between the sleeves. The annular cavity 15 permits a single source of fluid under pressure to be used. The cavity combined with the circumferential foramina assures uniform distribution of the lubricating fluid film which has formed and which will presently be described in more detail.

The liquid like substance to be transported is indicated at 25. A second, or what for the sake of clarity may be termed a lubricating fluid, is provided. A source of lubricating fluid under pressure is indicated at 26. The source 26 is connected to the cavity by conduit 27. The conduit 27 communicates with an aperture 28 which is preferably formed in the outer sleeve 12 at about the mid-point, longitudinally speaking. In a very long conduit, as for example in an oil line several miles in length, several sources of lubricating fluid may be provided.

When the device is in operation, a supply of lubricating fluid under pressure is introduced into the chamber 15. The lubricating fluid passes through the foraminous sleeve 11. The liquid like substance 25 to be conducted may be referred to as transported substance. The transported substance is introduced into the cavity or main flow passage 20. The transported fluid is under pressure to cause it to flow from one end to the other.

For optimum operating characteristics the transported liquid like substance 25 has a viscosity greater than the lubricating fluid. Further, it is necessary that the pressure of the lubricating fluid exceed the total pressure of the transported substance.

Because the lubricating fluid is under greater pressure, it will constantly filter through the foraminous sleeve 11. Since the transported substance is under hydrostatic pressure and is generally a "liquid" and the lubricating fluid is usually a gas, the two will not intermingle but rather a minute layer of lubricating fluid under pressure will be built up between the transported substance and the foraminous inner sleeve 11. This lubricating layer of fluid will completely surround the transported substance in a minutely thin layer which may even be of molecular thickness. This minute layer will flow axially and will constantly be escaping around the periphery of the transported substance at the outlet end of the conduit. The radial dimension of the lubricating layer of fluid is greatly exaggerated in the drawings for clarity of illustration. It is also shown, in an exaggerated manner, to have a constantly increasing radial dimension as the outlet end is approached.

One of the outstanding features of the invention is that this transporting fluid, which is preferably a gas, permits an extremely heavy substance, such as molasses, for example, to flow with the same frictional loss as that experienced by the lubricating fluid. For example, molasses again, will flow with approximately the facility of air if air is the "lubricating" fluid. Furthermore the conduit will require no cleaning as the transported mass never touches the confining surface.

As has been pointed out, the term fluid as applied to the substance forming the load carrying film refers to a liquid or a gas. The term liquid like substance as applied to the transported substance refers to say non-gaseous substance which is capable of flowing. Thus, as an example, the transported substance 25 may be a solid in fluid form such as molten metal or molten glass.

Another of the outstanding features is not as readily apparent. The lubricating and load supporting layer of lubricating fluid is also an insulator. Molten metal may be transported through a conduit without fear of its being cooled by the conduit and gradually solidifying and without fear of damaging the conduit as by melting or corrosion. It is believed that by this method and apparatus molten metal may for the first time be transported in a conduit without deterioration thereof.

Figure 3:
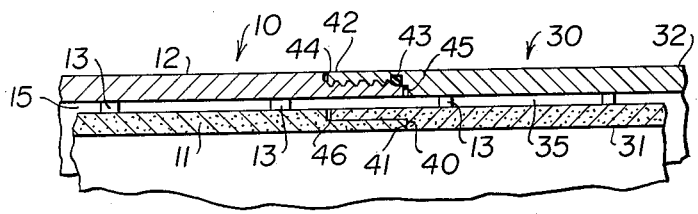

In FIGURE 3 an improved coaxial conduit connection is disclosed. For clarity of illustration the adjacent conduit sections are disclosed generally at 10 and 30. The numeral 31 discloses an inner sleeve which is identical to the inner sleeve 11; the numeral 32 an outer sleeve identical to the outer sleeve 12; and the numeral 35 a cavity which is identical to the cavity 15.

In forming a connection between adjacent conduit sections it is essential that the connection between the inner sleeves be such as to minimize or substantially prevent leakage without interfering with the metered flow through the foraminous structure. This is achieved by having ends 40, 41 of the inner sleeves 11, 31 abut one another. Slight spaces are provided at 44, 45, and 46 to assure full face contact of the ends 40, 41. The conduit sections 10, 30 are fixed together by suitable means. This may be achieved through the use of threads 42 on the outer sleeves 12, 32. These threads are shown at 42. An O-ring 43 is provided to make the connection between the outer sleeves fluid tight. The inner sleeve ends may be stepped as disclosed to minimize the fluid leakage between them.

The essential factor is that the inner sleeves must be slightly longer along their inner surfaces than the outer sleeves to assure contact of the ends 40, 41. This ingredient may be stated by saying that a line running along an inner sleeve inner surface from its first to its second end and parallel to the sleeve axis will be longer than any parallel line which intersects the outer sleeve and extends from the outer sleeve first to the outer sleeve second end.

There has thus been described a novel and improved fluid conduit for transporting fluids. The improved conduit has an inner foraminous sleeve and an outer imperforate sleeve, and means to introduce fluid under pressure to a cavity defined by the sleeve. An improved connection for joining sections of such improved coaxial fluid conduit has also been described.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of transporting a flowable substance through a main flow passage in an inner sleeve contained within an outer sleeve which method comprises, introducing a liquid fluid under pressure to the main flow passage to pass through the main flow passage and forming a film of a second and less viscous fluid gas about the periphery of the liquid fluid between the liquid and the inner sleeve and of gradually increasing thickness in direction of liquid fluid flow by introducing additional amounts of the second fluid throughout the main flow passage and maintaining said gas film throughout substantially the entire longitudinal length of said main flow passage by passing gas through pores of said inner sleeve formed throughout the length of the sleeve.

2. The method of transporting a flowable substance through a main flow passage in an inner sleeve contained within an outer sleeve which method comprises, introducing a liquid fluid under pressure into the main flow passage to pass the liquid fluid through the main flow passage and forming a film of a second fluid of lower viscosity having a lower coefficient of friction than said liquid fluid, maintaining said film about the periphery of the liquid fluid, through the entire length of said main flow passage and of gradually increasing thickness in direction of substance flow by passing the second fluid through foramina in said inner sleeve at locations along said inner sleeve and throughout the main flow passage, and maintaining a quantity of said gas under pressure in a cavity between said sleeve to cause all gas flow through said foramina to be from the cavity to the main flow passage.

3. A fluid conduit comprising, tubular inner and outer sleeves defining cavity means therebetween, means maintaining said sleeves in position relative to one another, said inner sleeve defining a through main flow passage, the inner sleeve having fluid compensating passages extending transversely therethrough and communicating with said cavity means and said main flow passage, each of said sleeves including a plurality of sections having stepped ends, each of said stepped ends including at least two transversely disposed end walls in axially offset relationship with one another, each innermost transversely disposed end wall of each inner sleeve section having an adjacent transversely disposed end wall and being in abutment with such adjacent innermost disposed end wall, and each of the remainder of the transversely disposed end walls being spaced from the other of said transversely disposed end walls.

4. The method of transporting a first substance through a conduit having inner and outer sleeves defining a cavity therebetween, which method comprises, introducing a liquid fluid under pressure into the main flow passage to pass a liquid into a main flow passage defined by the inner sleeve, keeping said liquid out of contact with said inner sleeve by introducing a gas under pressure and of a viscosity lower than the substance into the cavity, permitting the gas to pass through restricting and compensating passages in the inner sleeve under a sufficiently low pressure to substantially prevent co-mingling of the liquid and the gas and thereby to permit a lubricating and supporting film of said gas to form between the inner sleeve and the substance, maintaining said film substantially throughout the length of the inner sleeve and of gradually increasing thickness in the direction of fluid flow by introducing additional amounts of the second fluid throughout the main flow passage, and passing the liquid through said main flow passage while under pressure.

5. The method of transporting a liquid through a conduit having inner and outer sleeves defining a cavity therebetween, which method comprises introducing said liquid under pressure into a main flow passage defined by the inner sleeve, introducing a gas under pressure into the cavity, permitting the gas to pass through restricting and compensating passages in the inner sleeve to cause a lubricating and supporting film of gas to form between the inner sleeve and the liquid, maintaining said film substantially throughout the length of the inner sleeve, causing both the gas and the liquid to pass through the main flow passage with the gas forming a lubricating layer separate from the liquid and peripherally disposed about the liquid and of an increasing thickness in the direction of fluid flow provided by introducing additional amounts of the gas throughout the main flow passages.

6. The method of transporting a liquid through a conduit having inner and outer sleeves defining a cavity therebetween, which method comprises, introducing said liquid under pressure into a main flow passage defined by the inner sleeve, introducing a gas under pressure into the cavity, permitting the gas to pass through restricting and compensating passages in the inner sleeve to cause a lubricating and supporting film of gas to form between the inner sleeve and the substance, maintaining said film substantially throughout the length of the inner sleeve, causing both the gas and the substance to flow through the main flow passage with the gas forming a lubricating layer separate from the substance and disposed peripherally about the substance and of an increasing thickness in the direction of fluid flow provided by introducing additional amounts of the gas throughout the main flow passages.

7. The method of transporting a first liquid through a conduit having inner and outer sleeves defining a cavity therebetween, which method comprises, introducing said first liquid under pressure into a main flow passage defined by the inner sleeve, introducing a second liquid of lower viscosity substantially continuously along the length of the inner sleeve and under pressure greater than the pressure of said first liquid into the cavity, permitting the second liquid to pass through restricting and compensating passages in the inner sleeve under a sufficiently low pressure to substantially prevent co-mingling of the liquids and thereby to permit a lubricating and supporting film of the second liquid to form between the inner sleeve and the substance, maintaining said film substantially throughout the length of the inner sleeve, and of an increasing thickness in the direction of fluid flow provided by introducing additional amounts of the second liquid throughout the main flow passages.

References Cited in the file of this patent

UNITED STATES PATENTS

| | | |
|---|---|---|
| 759,374 | Isaacs | May 10, 1904 |
| 1,388,558 | Gilman | Aug. 23, 1921 |
| 1,454,485 | Persch | May 8, 1923 |
| 2,494,803 | Frost | Jan. 17, 1950 |
| 2,527,466 | Townsend | Oct. 24, 1950 |
| 2,631,759 | Hoopes | Mar. 17, 1953 |
| 2,658,527 | Kaiser | Nov. 10, 1953 |
| 2,821,205 | Chilton | Jan. 28, 1958 |

FOREIGN PATENTS

| | | |
|---|---|---|
| 680,460 | Great Britain | Oct. 8, 1952 |